United States Patent [19]

Gaylin

[11] Patent Number: 4,856,867
[45] Date of Patent: Aug. 15, 1989

[54] CARRIER CABLE, FIBER OPTIC CABLE, AND SHEATH SUPPORT ASSEMBLY

[76] Inventor: Wayne L. Gaylin, 2330 Athena Rd., West Linn, Oreg. 97068

[21] Appl. No.: 648,475

[22] Filed: Sep. 10, 1984

[51] Int. Cl.⁴ ............................................. G02B 6/44
[52] U.S. Cl. .................................... 350/96.23; 174/41
[58] Field of Search ........................ 350/96.23; 174/41

[56] References Cited

U.S. PATENT DOCUMENTS

| | | | |
|---|---|---|---|
| 989,212 | 4/1911 | Van Nostran | 174/41 |
| 1,905,761 | 4/1933 | John et al. | 174/41 |
| 2,451,004 | 10/1948 | Antwerp | 174/41 |
| 2,595,857 | 5/1952 | Kinsel | 174/41 |
| 2,956,311 | 10/1960 | Raydt et al. | 174/41 |
| 2,988,314 | 6/1961 | Urich | 174/41 |
| 3,042,353 | 7/1962 | O'Mara | 248/61 |
| 3,136,515 | 6/1964 | Potruch | 174/41 |
| 3,144,500 | 8/1964 | Schreyer | 174/41 |
| 3,464,660 | 9/1969 | Neale, Sr. | 248/61 |
| 4,201,607 | 5/1980 | Rautenberg et al. | 350/96.23 |
| 4,378,462 | 3/1983 | Arnold, Jr. et al. | 174/41 |
| 4,514,035 | 4/1985 | Steinmann et al. | 350/96.23 |

Primary Examiner—William L. Sikes
Assistant Examiner—Robert E. Wise
Attorney, Agent, or Firm—Kolisch, Hartwell & Dickinson

[57] ABSTRACT

A method of supporting a tension-sensitive fiber optic cable from a messenger strand where the messenger strand has a coefficient of linear expansion which substantially exceeds that of the cable. The method comprises placing the strand in an elevated position between two uprights, providing a flexible sheath having at least one internal passage extending therealong and a slit extending through the sheath providing access to the interior of the sheath, placing the fiber optic cable in the passage, loosely and slideably, by moving the cable through the slit into the passage. The sheath with the cable introduced therein is brought adjacent the messenger strand, the messenger strand is seated on the sheath, and the messenger strand and the sheath are secured to one another with external wrapping. A sheath support assembly for practicing the method of the invention is disclosed. The assembly includes an elongate, flexible containment means having a passage means extending therealong for receiving the cable and the messenger strand. The containment means includes entry means extending along the length thereof for allowing introduction of the cable and the strand to the passage means. Means extending about the containment means are provided for securing the containment means with the cable and strand received in the passage means.

9 Claims, 1 Drawing Sheet

CARRIER CABLE, FIBER OPTIC CABLE, AND SHEATH SUPPORT ASSEMBLY

BACKGROUND AND SUMMARY OF THE INVENTION

This invention relates to a method for supporting a fiber optic cable from a messenger strand and the provision of an assembly therefor. Specifically, the invention relates to a sheath support assembly which loosely contains a tension sensitive fiber optic cable which has a coefficient of linear expansion substantially less than that of the messenger strand and sheath support assembly.

When conventional electrical cable is suspended between upright support poles, a messenger strand, which is usually constructed of metal, is used to support the transmission cable. This poses no problem when the transmission cable is itself metallic in nature, as the respective coefficients of linear expansion of the messenger cable and the transmission cable are substantially similar. As changes in atmospheric conditions occur, such that the cables heat and cool, the cables elongate and contract with substantially equal changes in length. Metallic messenger strands and transmission cables may elongate and contract five inches or more over a span of 200 ft. when subjected to temperature extremes.

Modern communication systems are more and more relying on fiber optic techniques in place of conventional electrically conductive transmission cables. Briefly, a single fiber optic cable can transmit several hundred times more voice and data information than a similarly sized conventional metallic transmission cable. Rapid firing laser pulses are used to transmit information over a fiber optic cable. A fiber optic cable, however, does not exhibit the same elongation and contractive responses as does a conventional electrical transmission cable or a conventional metallic messenger strand. A fiber optic cable is substantially impervious to elongation and contraction when subjected to temperature variations. Additionally, a fiber optic cable is generally limited to bearing a load of 500 pounds.

Conventional support techniques are therefore inappropriate to aerial suspension of fiber optic cables. Were a fiber optic cable to be tightly bound to a messenger strand, as is a conventional transmission cable, the tension applied to the fiber optic cable as the messenger strand expanded, thereby reducing or eliminating its support, would initially distort the fiber optic cable and eventually would cause the fiber optic cable to break under its weight and the weight of a messenger strand.

An object of the instant invention is to provide a support assembly for supporting a fiber optic cable from a conventional, metallic messenger strand.

Another object of the invention is to provide a support assembly for a fiber optic cable where the coefficient of linear expansion for the fiber optic cable and the coefficient of linear expansion for the messenger strand are substantially unequal.

A further object of the invention is to provide a method of supporting a tension sensitive cable from a messenger strand where the messenger strand has a coefficient of linear expansion which substantially exceeds that of the tension sensitive cable.

The instant invention includes a sheath support assembly which includes an elongate, flexible containment means having a passage extending therealong. A portion of the passage receives a fiber optic cable. The cable is loosely and slideably received within the passage. Another portion of the passage receives a messenger strand to support the assembly. The containment means has an entry means extending along its length for allowing introduction of the cable and the strand to the containment means. Means are provided for securing the containment means with the messenger strand received therealong.

These and other objects and advantages of the instant invention will become more fully apparent as the description which follows is read in conjunction with the drawings.

DETAILED DESCRIPTION OF THE INVENTION

Figure 1:
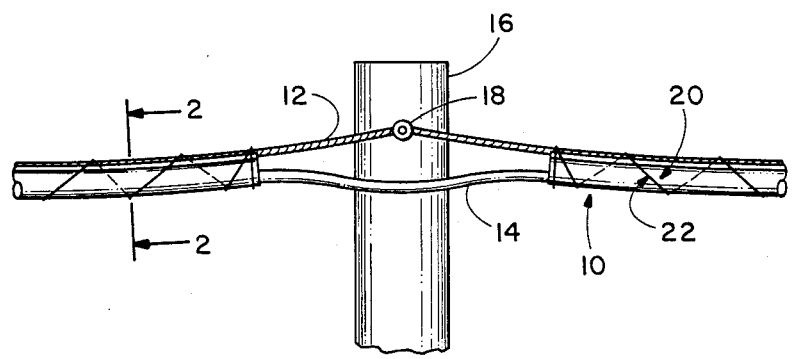
FIG. 1 is a side view of a preferred embodiment of the invention suspended by an upright.

Turning now to the drawings, and initially FIG. 1, a sheath support assembly is shown generally at 10. The assembly is supported by a messenger strand 12, and has a tension-sensitive, fiber optic cable 14 received therein. Messenger strand 12 is suspended along a series of uprights, one of which is shown at 16. The strand is secured to upright 16 by means of a fastener 18.

Assembly 10 includes an elongate, flexible containment means, or sheath, 20 and means extending about the containment means for securing the containment means with the messenger strand received therealong. The means extending take the form, in the preferred embodiment, of a helical wrapping 22 which may be metallic or plastic strands.

Figure 2:
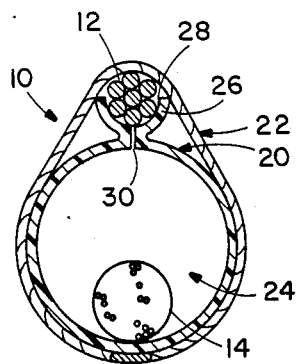
FIG. 2 is a cross section of a messenger strand, a fiber optic cable and a sheath support assembly taken generally along the line 2—2 in FIG. 1.

Turning now to FIG. 2, sheath 20 has passage means extending therealong. A first portion 24 of the passage means is an internal, elongate cavity which is integrally formed with the containment means.

A second portion of the passage means is also integrally formed with the containment means and extends therealong. The second portion is an external trough 26 in this embodiment of the assembly.

Entry means extend the length of the sheath for allowing introduction of the cable and the strand to the passage means of the sheath. In the preferred embodiment, entry means is an open top, shown generally at 28, on trough 26, and an elongate slit 30, which extends between the base of trough 26 and cavity 24.

Sheath 20 is formed of a flexible plastic material, such as polyethylene or PVC. The material may be extruded into the desired form and stored on spools until put into use.

To provide a support for a tension-sensitive fiber optic cable, a messenger strand is suspended between multiple uprights, such as upright 16 shown in FIG. 1, and is held in place by fasteners, such as fastener 18. The messenger strand may be drawn taught between uprights, or may be strung in a catenary between two uprights.

A fiber optic cable is introduced into sheath 20 through the entry means, i.e., open top 28 and slit 30. Slit 30 may be formed in the extruded sheath either at the point of manufacture, or the slit may be made in the field, immediately prior to introduction of cable 14. Cable 14 is loosely and slideably introduced into cavity 24, thereby allowing for linear expansion of sheath 20 relative to cable 14.

Once the cable has been introduced into cavity 24, sheath 20, with cable 14 therein, is elevated adjacent the messenger strand and the messenger strand is seated in trough 26. The sheath and messenger strand are then wrapped by means of wrapping 22 to secure the sheath to the messenger strand.

As depicted in FIG. 1, the sheath is not continuous along the length of the messenger strand and the fiber optic cable. A portion of the sheath is removed from the messenger strand and the cable adjacent an upright. This is done to allow expansion of the sheath and the messenger strand in a manner which precludes placing tension on cable 14.

Figure 3:
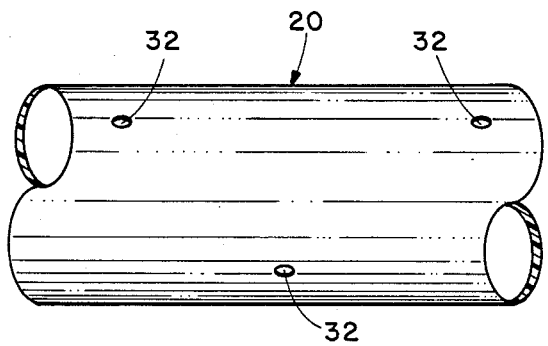
FIG. 3 is a bottom view of the sheath support assembly of the invention.

Drain means, which in the preferred embodiment take the form of bores formed in the bottom surface of the sheath, such as shown at 32 in FIG. 3, are provided to allow the escape of water from the passage means. The bores connect the passage means with the exterior of the sheath, thereby allowing escape of water. Water may be introduced into the passage means either through the open ends of the sheath adjacent a support, or may be introduced through the open top 28 of trough 26 and thence through slit 30.

As previously stated, messenger strand 12 and sheath 20 have a coefficient of linear expansion such that their length may vary by five or more inches over a 200 ft. span when they are subjected to temperature extremes. Cable 14, on the other hand, has a coefficient of linear expansion which is less than 10% of the coefficient for the sheath and messenger strand. Thus, while the messenger strand and sheath are elongating approximately five inches over a 200 ft. stretch, cable 14 will elongate less than one-half inch. Were the cable not loosely and slideably contained within sheath 20, cable 14 would ultimately bear the majority of weight of the messenger strand, sheath and cable, resulting in damage and possible breakage to cable 14.

Figure 4:
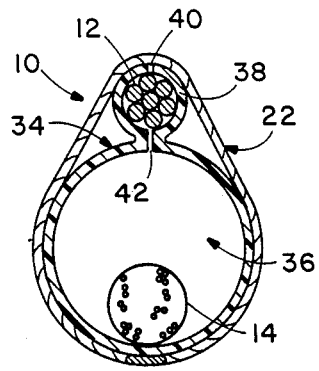
FIG. 4 is a cross sectional view, similar to that of FIG. 2, showing a modified form of the invention.

Turning now to FIG. 4, a modified form of the containment means is depicted. In this embodiment, containment means, or sheath 34, includes a first portion in the form of an internal elongate cavity 36, which is similar to cavity 24 in the previous embodiment. The second portion of the passage means is a substantially closed tubular receiver 38 which is integrally formed with the sheath. Entry means comprises a pair of slits 40, 42 which extend through the receiver 38 and then between receiver 38 and cavity 36, respectively.

As with the previously described embodiment, messenger strand 12 is suspended between uprights, cable 14 is introduced into cavity 36, and sheath 34 is then elevated adjacent the messenger strand. The messenger strand is introduced into receiver 38 through slit 40. Wrapping 22 is placed about the messenger strand and the sheath to secure the two together. Drain means are also provided in this embodiment.

Figure 5:
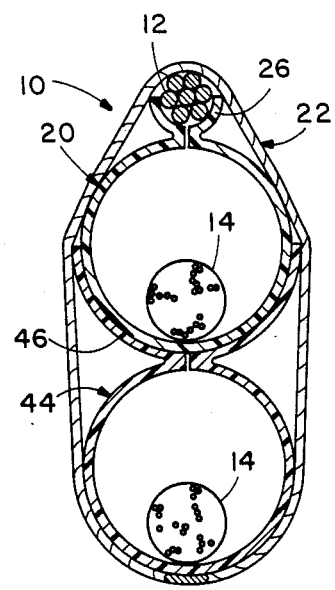
FIG. 5 is a cross sectional view, similar to FIG. 2, showing a modified form of the invention for supporting multiple fiber optic cables.

Referring now to FIG. 5, an arrangement is depicted whereby multiple fiber optic cables may be suspended from a single messenger strand. A sheath, such as sheath 20, is depicted with a cable 14 therein. A modified version of a sheath is shown at 44. In this form of the sheath, the second portion of the passage means, or external trough 46, is conformal with the outer portion of sheath 20 such that sheath 20 may be received within trough 46.

As with the previously described embodiments, cables 14 are introduced into the elongate cavities of the sheathes prior to the sheath being elevated adjacent the messenger strand. Sheath 20 may be joined to a sheath configured like sheath 44 and additional sheathes may be joined to sheath 44 to provide support for multiple fiber optic cables. Once the multiple sheathes have been assembled and positioned with the messenger strand seated in trough 26, wrapping 22 is secured about the messenger strand and the sheathes to secure the assembly to the messenger strand.

In the forms of the containment means thus far described, the first portion of the passage means is an elongate, substantially cylindrical bore. The diameter of the fiber optic cable is generally less that one-half the inner diameter of the bore, therefore the bore is substantially unoccupied other than by the fiber optic cable. Specifically, the fiber optic cables used for voice and data transmission generally have diameter on the order of 0.4 inches (1.016 cm.). The inner diameter of the sheath cavity is on the order of one inch (2.54 cm.). A sidewall of 0.15 inches (0.381 cm.) about the internal cavity has been found to be sufficient to support the fiber optic cable and withstand the elements. The messenger strand generally has a diameter of 0.31 inches (0.7874 cm.).

Figure 6:
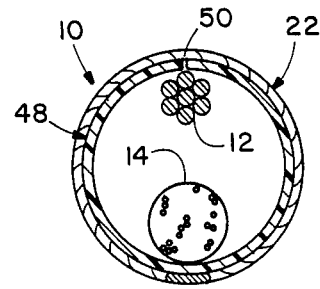
FIG. 6 is a cross sectional view of another modified form of the invention.

Referring now to FIG. 6, another modified form of containment means is shown at 48. In this embodiment, passage means are formed in the interior of the containment means. A first portion of the passage means, which is located in the bottom of the containment means, receives the fiber optic cable. A second portion is located in the top of the containment means and receives the messenger strand. As with the previously described embodiments, containment means 48 is an extruded plastic material, having an entry means or slit 50 which allows introduction of fiber optic cable 14 to the containment means. Once the cable is so introduced, the containment means are brought adjacent a previously suspended messenger strand 12 which is also introduced into the passage means of the containment means. External wrapping 22 is then placed about the containment means and secures the containment means with the cable and the strand received in the passage means. Drain means are also provided in this embodiment to allow exit of water from the containment means.

While a preferred embodiment and several modified forms of the instant invention have been depicted, it is to be understood that further variations and modifications may be made without departing from the spirit of the invention.

It is claimed and desired to secure by Letters Patent:

1. In combination with an elongate messenger strand extending in a suspended expanse between spaced uprights supporting the ends of the expanse of strand, the messenger strand having a given coefficient of linear expansion, the combination further including a cable at least coextensive with the expanse of messenger strand having a coefficient of linear expansion which is substantially less than that of the messenger strand, a sheath support assembly interconnecting the strand expanse and cable throughout essentially the length of the expanse whereby the cable becomes suspended by the expanse of strand, the assembly comprising an elongate, flexible sheath extending the length of the assembly having passage means extending therealong, said passage means including a first portion extending the length of the assembly having a floor and said first portion receiving said cable with the cable loosely and slideably resting on said floor, said passage means further including a second portion receiving said messenger strand, said sheath having entry means extending the length thereof for allowing introduction of the cable and the strand to said passage means of said sheath, and means extending about said sheath securing said sheath circumferentially and throughout the length of the assembly with said cable and strand received in said passage means.

2. The combination of claim 1, wherein said first portion of said passage means is an internal, elongate cavity integrally formed within and extending the length of the sheath, said second portion of said passage means is defined by an external trough integrally formed on the outside of and extending the length of the sheath, and said entry means comprises an open top extending along the trough and a slit extending between said trough and said cavity.

3. The combination of claim 1, wherein said first portion of said passage means is an internal, elongate cavity integrally formed within and extending along the length of the sheath, said second portion of said passage means is defined by a substantially closed tubular receiver integrally formed with and extending along the length of the sheath, and said entry means comprises a pair of slits, one of which extends through said tubular receiver, the other of which extends between said receiver and said cavity.

4. The combination of claim 1, wherein sheath includes drain means spaced along the length of the sheath connecting said passage means with the exterior of the sheath.

5. A method of supporting a tension-sensitive fiber optic cable from a messenger strand, where the messenger strand has a coefficient of linear expansion which substantially exceeds that of the cable, the method comprising placing the strand in an elevated, suspended position between two uprights, providing a flexible elongate sheath having a length sufficient to essentially span the distance between the uprights and the sheath having a wall defining within the sheath at least one internal passage which includes a floor bottoming the passage and the passage extending the length of the sheath, the sheath further having a slit extending along the length of the sheath, and through the wall of the sheath providing access to the internal passage of the sheath, placing said cable in said passage with the cable extending loosely in said passage and resting on said floor by moving the cable laterally through said slit into the passage, bringing the sheath with the cable therein up to the messenger strand and seating the strand on the sheath with such extending therealong, and circumferentially securing along the length of the sheath and with external wrapping the sheath and strand.

6. The method of claim 5 which includes forming an external, integral trough on and extending the length thereof the sheath, which trough receives the messenger strand.

7. The method of claim 5 which includes forming an external, integral tube on and extending the length of the sheath, which tube receives the messenger strand.

8. The method of claim 5 wherein the sheath is terminated adjacent an upright to leave the messenger strand exposed, and the strand, where exposed, is secured to the upright in placing the strand in its elevated position.

9. In the installing of a suspended combination of messenger strand and fiber optic where such combination extends in a suspended between spaced uprights, the method comprising providing an elongate flexible sheath having a length sufficient to essentially span the distance between the uprights which sheath has a circumferential wall defining within the sheath an internal passage extending the length of the sheath, said passage including a floor that bottoms said passage along the length of the sheath, providing a slit along the length of the sheath through the wall of the sheath to provided lateral access to the internal passage, placing said cable in said passage with the cable extending loosely in said passage and resting on said floor by moving the cable laterally through such slit into the passage, with the cable placed bringing the sheath and strand together to establish a side-by-side relationship of the sheath and strand, with external wrapping, extending the length of the sheath and about the strand and the sheath circumferentially securing the sheath to prevent opening of the sheath where slit and to provide external support for the sheath by the strand throughout the length of the sheath, and said installation being formed with securing of the strand to the uprights with the strand suspended between the uprights and the strand through support of the sheath providing for suspension of the cable which is within the sheath.

* * * * *